United States Patent
Choi et al.

(10) Patent No.: US 12,519,162 B2
(45) Date of Patent: Jan. 6, 2026

(54) BATTERY CELL AND METHOD OF MANUFACTURING THE SAME

(71) Applicant: SK On Co., Ltd., Seoul (KR)

(72) Inventors: Gil Yong Choi, Daejeon (KR); Joo Hyung Kim, Daejeon (KR); Hyung Joon Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 17/569,301

(22) Filed: Jan. 5, 2022

(65) Prior Publication Data

US 2022/0223950 A1   Jul. 14, 2022

(30) Foreign Application Priority Data

Jan. 12, 2021   (KR) .................. 10-2021-0004182

(51) Int. Cl.
  *H01M 50/184*   (2021.01)
  *H01M 50/105*   (2021.01)

(52) U.S. Cl.
  CPC ....... *H01M 50/184* (2021.01); *H01M 50/105* (2021.01)

(58) Field of Classification Search
  CPC ............. H01M 50/184; H01M 50/105; H01M 50/136; H01M 50/124
  See application file for complete search history.

(56) References Cited

U.S. PATENT DOCUMENTS

| | | |
|---|---|---|
| 6,451,476 B1 | 9/2002 | Chang et al. |
| 2007/0009795 A1* | 1/2007 | Otohata ............ B29C 66/83221 |
| | | 429/176 |
| 2020/0111999 A1 | 4/2020 | Kim et al. |

(Continued)

FOREIGN PATENT DOCUMENTS

| | | |
|---|---|---|
| JP | H11-260327 A | 9/1999 |
| JP | 3905973 B2 * | 4/2007 |
| KR | 10-1660443 B1 | 9/2016 |

(Continued)

OTHER PUBLICATIONS

Publishers, H. (n.d.). The American Heritage Dictionary Entry: Oppose. American Heritage Dictionary Entry: oppose. https://www.ahdictionary.com/word/search.html?q=oppose (Year: 2023).*

(Continued)

*Primary Examiner* — Matthew T Martin
*Assistant Examiner* — Grace Ann Kenlaw
(74) *Attorney, Agent, or Firm* — IP & T GROUP LLP

(57) ABSTRACT

A battery cell includes an accommodation portion accommodating an electrode assembly; and a sealed portion extending from a side surface of the accommodation portion externally, and being folded a plurality of times and fixed to be included within a thickness range of the accommodation portion, wherein the sealed portion includes a folded portion disposed to oppose the side surface of the accommodation portion and having a width narrower than the thickness range of the accommodation portion; and a connection portion connecting a center of the folded portion and the accommodation portion, wherein the folded portion includes at least one bent portion formed by folding the sealed portion by 180°.

6 Claims, 17 Drawing Sheets

(56) References Cited

U.S. PATENT DOCUMENTS

2020/0343575 A1* 10/2020 Kim .................... H01M 10/049
2021/0288365 A1    9/2021 Lee et al.

FOREIGN PATENT DOCUMENTS

| KR | 10-2017-0055144 A | 5/2017 | | |
| KR | 10-1781828 B1 | 9/2017 | | |
| KR | 10-2018-0013671 A | 2/2018 | | |
| WO | WO-2018117657 A1 * | 6/2018 | .......... | H01M 2/0207 |
| WO | WO-2019190145 A1 * | 10/2019 | ............ | C09J 175/04 |
| WO | WO-2020066520 A1 * | 4/2020 | | |

OTHER PUBLICATIONS

Extended European Search Report for European Patent Application No. 22151246.0 issued by the European Patent Office on May 31, 2022.

* cited by examiner

BATTERY CELL AND METHOD OF MANUFACTURING THE SAME

CROSS-REFERENCE TO RELATED APPLICATION(S)

This application claims benefit of priority to Korean Patent Application No. 10-2021-0004182 filed on Jan. 12, 2021 in the Korean Intellectual Property Office.

BACKGROUND

1. Field

The present disclosure relates to a battery cell and a method of manufacturing the same.

2. Description of Related Art

Unlike primary batteries, secondary batteries such as a battery cell may charge and discharge electricity, to be applied to devices within various fields such as digital cameras, mobile phones, notebook computers, hybrid vehicles, and electric vehicles. Examples of the secondary batteries include a nickel-cadmium battery, a nickel-metal hydride battery, a nickel-hydrogen battery, a lithium secondary battery, and the like.

Such secondary batteries may be generally formed by stacking a cathode, a separator, and an anode. Materials thereof may be selected in consideration of a lifespan, charge/discharge capacity, temperature characteristics, stability, or the like of a battery.

Such secondary batteries may be classified into a pouch-type secondary battery and a can-type secondary battery, according to a material of a case accommodating an electrode assembly. In the pouch-type secondary battery, an electrode assembly may be accommodated in a pouch made of a soft polymer material having a non-uniform shape. In the can-type secondary battery, an electrode assembly may be accommodated in a case made of a material such as a metal, a plastic, or the like, having a constant shape.

A conventional pouch-type battery cell may include an accommodation portion for accommodating an electrode assembly, and a sealed portion formed by bonding a pouch. Accordingly, when the accommodation portion is formed to have a thin thickness, the sealed portion may be disposed to protrude from the accommodation portion externally. As such, when the sealed portion is disposed to protrude from the accommodation portion, there may be a problem in that interference between the sealed portion and other elements may occur in a process of manufacturing a battery module.

Accordingly, there may be a demand for a battery cell capable of minimizing the above-described interference.

SUMMARY

An aspect of the present disclosure is to provide a battery cell in which a sealed portion does not protrude from an accommodation portion externally, and a method of manufacturing the same.

According to an aspect of the present disclosure, a battery cell includes an accommodation portion accommodating an electrode assembly; and a sealed portion extending from a side surface of the accommodation portion externally, and being folded a plurality of times and fixed to be included within a thickness range of the accommodation portion, wherein the sealed portion includes a folded portion disposed to oppose the side surface of the accommodation portion and having a width narrower than the thickness range of the accommodation portion; and a connection portion connecting a center of the folded portion and the accommodation portion, wherein the folded portion includes at least one bent portion formed by folding the sealed portion by 180°.

In this embodiment, the folded portion may include a first bent portion formed by folding the sealed portion by 180°; and a second bent portion spaced apart from the first bent portion and formed by folding the sealed portion by 180°, wherein a distance between the first bent portion and the second bent portion may define the width of the folded portion.

In this embodiment, the width of the folded portion may be formed to be smaller than the thickness range of the accommodation portion by 2 mm or more.

In this embodiment, the connection portion may include a third bent portion formed by folding the sealed portion by 90°.

In this embodiment, the folded portion may include a fourth bent portion formed in a position opposing the third bent portion, wherein the fourth bent portion may be formed by folding the folded portion such that the folded portion approaches the accommodation portion.

In this embodiment, the thickness range of the accommodation portion may be formed in a range of 6 mm to 8 mm.

In this embodiment, the width of the sealed portion may be formed to be larger than the thickness range of the accommodation portion, in a planar state that is unbent.

In this embodiment, the folded portion may include a first folded portion and a second folded portion, separated by the first bent portion, and a third folded portion separated from the second folded portion by the second bent portion, wherein the first folded portion may be disposed such that at least a portion thereof is in contact with the third folded portion.

According to another aspect of the present disclosure, a method of manufacturing a battery cell, includes forming a sealed portion by bonding an edge of a first case and an edge of a second case in contact with each other; forming a first bent portion by folding the sealed portion by 180°; forming a third bent portion by folding the sealed portion by 90°; and forming a second bent portion by folding a portion between the first bent portion and the third bent portion by 180°.

In this embodiment, the method may further include forming a groove for bending in a position in which the first bent portion and the second bent portion are formed, after forming the sealed portion.

In this embodiment, the method may further include pressing the sealed portion with a high-temperature pressurizing device, after forming the second bent portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
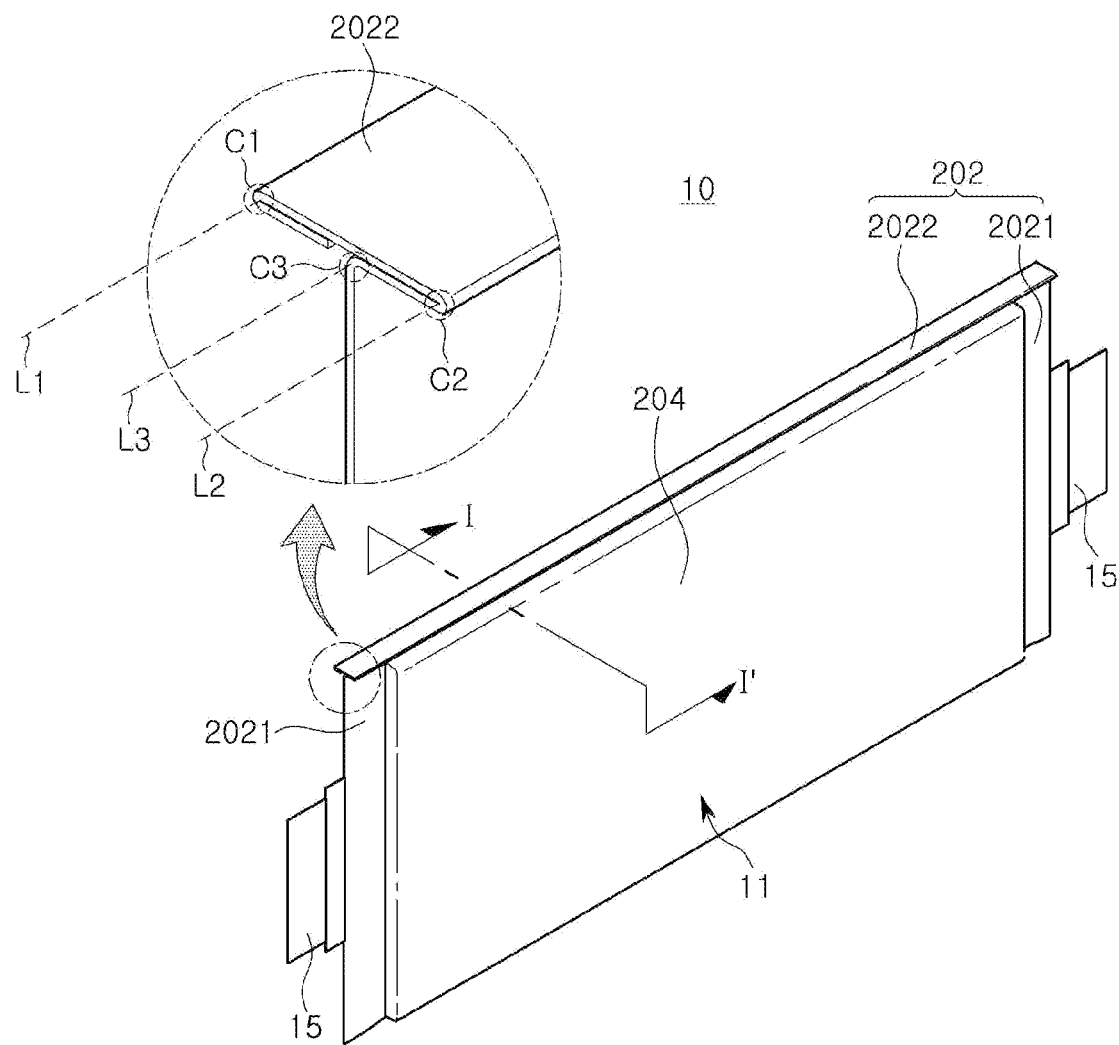
FIG. 1 is a perspective view schematically illustrating a pouch-type battery cell according to an embodiment of the present disclosure.

Prior to the detailed description of the present disclosure, terms or words used in the specification and claims, described below, should not be construed as being limited to their ordinary or dictionary meanings, and the inventors should develop their own inventions in the best way. It should be interpreted as meaning and concept consistent with the technical idea of the present disclosure, based on the principle that it may be appropriately defined as a concept of a term for explanation. Therefore, it should be understood that since embodiments described in the specification and configurations illustrated in the drawings may be only the most preferred embodiments of the present disclosure, and do not represent all the technical ideas of the present disclosure, there may be various equivalents and variations to be replaced at the time of filing the present disclosure.

Hereinafter, preferred embodiments of the present disclosure will be described in detail with reference to the accompanying drawings. In this case, it should be noted that the same components in the accompanying drawings may be denoted by the same reference numerals as much as possible. In addition, detailed descriptions of well-known functions and configurations that may obscure the gist of the present disclosure will be omitted. For the same reason, some components may be exaggerated, omitted, or schematically illustrated in the accompanying drawings, and a size of each of the components does not fully reflect an actual size thereof.

For example, in the present specification, expressions of "upper," "upper side," "upper portion," "lower," "lower side," "lower portion," "side," "side surface," and the like may be described with reference to the drawings, and are noted in advance that if a direction of an object is changed, it may be expressed differently.

Figure 2:
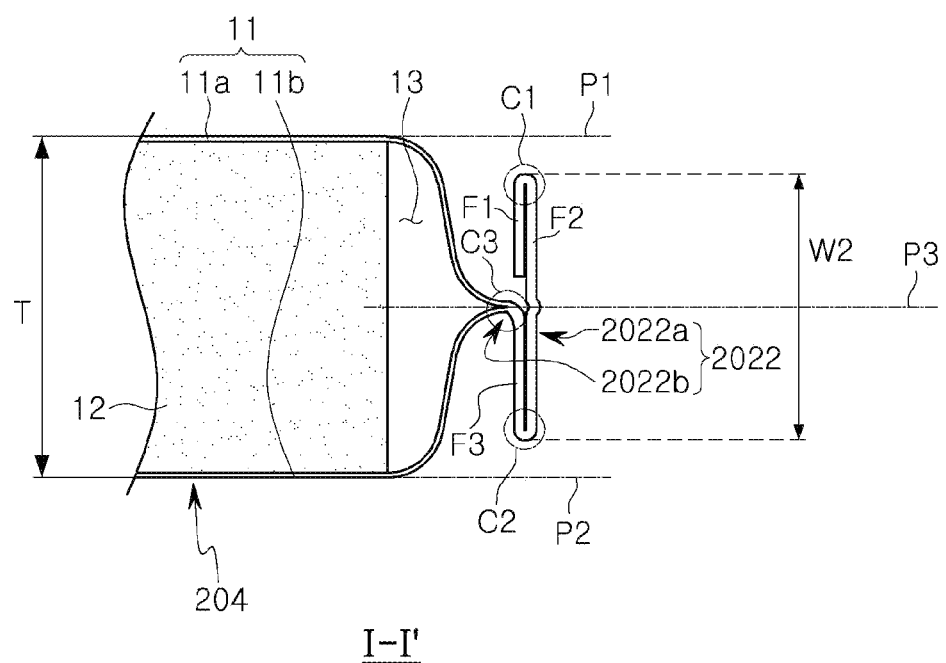
FIG. 2 is a cross-sectional view of FIG. 1, taken along line I-I'.

FIG. 1 is a perspective view schematically illustrating a pouch-type battery cell according to an embodiment of the present disclosure, and FIG. 2 is a cross-sectional view of FIG. 1, taken along line I-I'.

Referring to FIGS. 1 and 2, a battery cell 10 according to this embodiment may include an electrode assembly 12 and a case 11 accommodating the electrode assembly 12.

The battery cell 10 according to this embodiment may be a rechargeable secondary battery, and may include a lithium ion (Li-ion) battery or a nickel metal hydride (Ni-MH) battery. The nickel metal hydride battery may be a secondary battery using nickel for a positive electrode, a hydrogen storage alloy for a negative electrode, and an aqueous alkali solution as an electrolyte. The nickel metal hydride battery may have relatively large capacity per unit volume, and may thus be used as an energy source for electric vehicles (EVs) and hybrid vehicles (HEVs), and used in various fields such as energy storage or the like.

The battery cell 10 may have a pouch-type structure.

The case 11 may be, for example, used by insulating a surface of a metal layer made of aluminum. The insulation may include applying modified polypropylene, which is a polymer resin, for example, cast polypropylene (CPP), and forming a resin material such as nylon or polyethylene terephthalate (PET) on an outer surface thereof.

The case 11 may include an accommodation portion 204 for providing an accommodation space 13 therein. The electrode assembly 12 may be accommodated in the accommodation space 13 in the case 11. In addition, electrode leads 15 may protrude from the case 11.

The electrode assembly 12, together with an electrolyte, may be accommodated in the accommodation portion of the case 11. The case 11 may be formed by contacting a first case 11b and a second case 11a, and then bonding an edge of the first case 11b and an edge of the second case 11a to seal the accommodation space 13. As such, the accommodation portion 204 may be completed. A thermal fusion method may be used as a method of bonding the edges, but may not be limited thereto. Hereinafter, a portion in which the edges are bonded may be referred to as a sealed portion 202.

The sealed portion 202 may be formed to form a flange extending from the accommodation portion 204 externally, and thus the sealed portion 202 may be disposed along an outer edge of the accommodation portion 204.

In this embodiment, the sealed portion 202 may be divided into a first sealed portion 2021 in which the electrode lead 15 is disposed, and a second sealed portion 2022 in which the electrode lead 15 is not disposed. Therefore, the second sealed portion 2022 of this embodiment may comprehensively refer to a sealed portion in which the electrode lead 15 is not disposed, among sealed portions provided in various types of battery cells not illustrated in the present disclosure.

In this embodiment, the case 11 may be formed by forming a single sheet of exterior material. More specifically, after forming one or two accommodation spaces 13 in one exterior material, the battery cell 10 may be completed by folding the exterior material such that the accommodation spaces 13 form one space.

Therefore, in the battery cell 10 of this embodiment, it is not necessary to form the sealed portion 202 on a side surface (a lower surface in FIG. 1) on which the exterior material is folded. Therefore, in this embodiment, the sealed portion 202 may only be provided on three side surfaces among four side surfaces forming the outer edge of the accommodation portion 204, and the sealed portion may not be disposed on any one side surface of the outer edge of the accommodation portion 204 (the lower surface in FIG. 1).

In this embodiment, since the electrode leads 15 may be disposed to oppose each other in opposite directions, the two electrode leads 15 may be respectively disposed on the sealed portions 202 formed on different side surfaces. Therefore, the sealed portion 202 may include two first sealed portions 2021 in which the electrode lead 15 is disposed, and one second sealed portion 2022 in which the electrode lead 15 is not disposed.

Since the sealed portion 202 should tightly seal the accommodation space 13, when an area of the sealed portion 202 is excessively small, it may be difficult to secure bonding reliability. Therefore, the sealed portion 202 needs to be formed to have a predetermined width or more.

Figure 3:
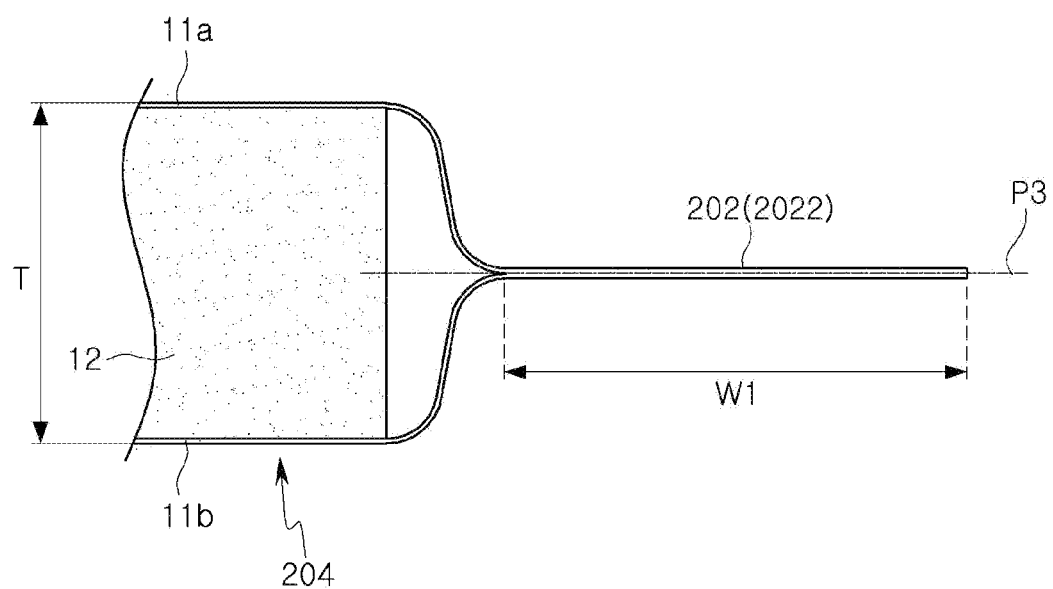
FIGS. 3 to 8 are views illustrating a method of manufacturing the battery cell of FIG. 2.

The present applicant confirmed by an experiment that minimum bonding reliability is ensured only when a width W1 of the sealed portion 202 is formed to be 6.5 mm or more, in a planar state in which the sealed portion 202 is unbent, as illustrated in FIG. 3. Therefore, in this embodiment, the width W1 of the sealed portion 202 may be formed to be 6.5 mm or more. For example, the width W1 of the sealed portion 202 may be formed to be larger than a thickness range T of the accommodation portion 204. When a thickness of the battery cell 10 is 6.5 mm or less, the sealed portion 202 may be formed to have a width of 6.5 mm or more.

An entire region of the sealed portion 202 may be formed as a bonding region, but is not limited thereto. Only a portion of the sealed portion 202 may be formed as the bonding region. In this case, a remaining region other than the bonding region may be disposed outside the accommodation portion 204 in an overlapping form, without the exterior materials being bonded to each other.

To minimize a volume occupied by the sealed portion 202 in a battery module, the sealed portion 202 may be formed to have a shape, folded at least once. More specifically, in the battery cell 10 according to this embodiment, the second sealed portion 2022 in which the electrode lead 15 is not disposed, among the sealed portions 202, may be configured to be folded a plurality of times.

The second sealed portion 2022 may be folded to reduce an area of the battery cell 10. In addition, when a plurality of battery cells 10 are stacked in the battery module, the second sealed portion 2022 may be disposed within the thickness range T of the battery cell 10, to suppress contact or interference with other battery cells 10, disposed adjacent to each other.

To this end, the second sealed portion 2022 of this embodiment may be folded in an overlapping form by bending at least once by 180°, to minimize the width W1 of the second sealed portion 2022.

In addition, the second sealed portion 2022 may be bent and folded at least once by 90° or more. Therefore, the second sealed portion 2022 may be disposed in close contact with the accommodation portion 204.

To this end, the second sealed portion 2022 of this embodiment may include a folded portion 2022a disposed side by side in a thickness direction of the accommodation portion 204 and having a width, smaller than the thickness range T of the accommodation portion 204, and a connection portion 2022b connecting the folded portion 2022a and the accommodation portion 204.

The folded portion 2022a may be formed to have a width, smaller than the thickness range T of the accommodation portion 204, through a first bent portion C1 and a second bent portion C2, to be described later, may be disposed to face a side surface of the accommodation portion 204, and may be disposed side by side in the thickness direction of the accommodation portion 204.

The first bent portion C1 and the second bent portion C2 may be respectively arranged on width direction both sides of the folded portion 2022a. Therefore, a width W2 of the folded portion 2022a may be defined as a distance between the first bent portion C1 and the second bent portion C2, to be described later, or a width of a second folded portion F2 to be described later.

The connection portion 2022b may connect the folded portion 2022a and the accommodation portion 204, and may include a third bent portion C3 to be described later. The connection portion 2022b may connect a center of the folded portion 2022a to the accommodation portion 204. More specifically, the connection portion 2022b may be bent by 90° by the third bent portion C3 at a width direction center of the folded portion 2022a, to be connected to the accommodation portion 204.

In a process of manufacturing the battery cell 10, the width W2 of the folded portion 2022a may have a deviation due to a tolerance in manufacturing the same. Therefore, in the battery cell 10 according to this embodiment, as illustrated in FIG. 2, the width W2 of the folded portion 2022a may be smaller than the thickness range T of the accommodation portion 204.

More specifically, the folded portion 2022a may be disposed to be spaced apart from two planes P1 and P2 defining the thickness range T of the battery cell 10 by a predetermined distance.

In this case, the above-described separation distance, spaced apart, may be defined based on a thickness of the folded portion 2022a. In this embodiment, a thickness of the second sealed portion 2022 may be 0.3 mm to 0.4 mm. When the second sealed portion 2022 is folded by 180° to form the folded portion 2022a, the thickness of the folded portion 2022a may be formed to be about 0.6 mm to 0.8 mm. Therefore, in consideration of lifting of a portion to be bonded, a maximum thickness of the folded portion 2022a may be considered to be approximately 1 mm.

Therefore, in the battery cell 10 of this embodiment, both sides of the folded portion 2022a may be spaced apart from the two planes P1 and P2 by 1 mm or more, and thus the width W2 of the folded portion 2022a may be defined as a smaller range by 2 mm or more, compared to the thickness range T of the accommodation portion 204.

The second sealed portion 2022 of this embodiment may include the first, second, and third bent portions C1, C2, and C3. In addition, the folded portion 2022a may include a first folded portion F1 and a second folded portion F2, divided by the first bent portion C1, and a third folded portion F3 that may be distinguished from the second folded portion F2 by the second bent portion C2.

The first bent portion C1 may be a portion in which the second sealed portion 2022 is folded along a first bending line L1, and the second sealed portion 2022 may be bent by 180° in the first bent portion C1. Therefore, the first bent portion C1 may be folded in such a manner that the first folded portion F1 overlaps the second folded portion F2, based on the first bending line L1.

The second bent portion C2 may be a portion in which the second sealed portion 2022 is folded along a second bending line L2, and the second sealed portion 2022 may be bent and folded by 180°, like the first bent portion C1. Therefore, the second bent portion C2 may be folded in such a manner that the third folded portion F3 overlaps the second folded portion F2, based on the second bending line L2.

The third bent portion C3 may be a portion in which the second sealed portion 2022 is folded along a third bending line L3, and the second sealed portion 2022 may be bent and folded by 90°.

Therefore, the second sealed portion 2022 of this embodiment may be folded by 180° along the first bending line L1 and the second bending line L2, respectively, and may be folded by 90° along the third bending line L3. Therefore, an overall angle at which the second sealed portion 2022 is bent may be 450° by adding up the first bent portion C1 (180°), the second bent portion C2 (180°), and the third bent portion C3 (90°).

Referring to FIG. 2 in which the sealed portion 202 has been formed, the first bent portion C1 and the second bent portion C2 in the folded portion 2022a may be arranged in opposite directions to each other. In addition, the third bent portion C3 may be located between the first bent portion C1 and the second bent portion C2.

In addition, the second sealed portion 2022 of this embodiment may be disposed to be bisected by a plane P3 (hereinafter, referred to as a first reference plane) in which the first case 11b and the second case 11a are in contact. Therefore, as illustrated in FIG. 2, a portion of the second sealed portion 2022 may be disposed on one side of the first reference plane P3 (e.g., in an upper portion), and a remaining portion thereof may be on the other side of the first reference plane P3 (e.g., in a lower portion).

When the first, second, and third folded portions F1, F2, and F3 are not arranged to be in close contact, a volume of the battery cell in a plane direction may increase. Therefore, the battery cell 10 of this embodiment may fold the sealed portion at 180° to bring the first, second, and third folded portions F1, F2, and F3 into close contact as much as possible, to minimize a thickness of the folded portion 2022a.

In conventional battery cells having a thick thickness, a folded portion may be disposed on only one side of a first reference plane P3, among both sides thereof, because a thickness T of each of the battery cells is sufficiently thick, compared to a width of the folded portion. Therefore, the folded portion may be disposed within a range T/2 corresponding to half of a thickness range T of each of the battery cells. This configuration may have a problem in that it is difficult to apply to a thin battery cell having a thickness T of the battery cell of 8 mm or less.

According to this embodiment, since the width W2 of the folded portion 2022a should be formed in a range smaller than the thickness range T of the battery cell 10 by 2 mm or more, in a thin battery cell 10 in which the thickness T of the battery cell 10 is 8 mm, the width W2 of the folded portion 2022a should be defined to be 6 mm or less.

Therefore, when a width (W1 of FIG. 3) of the second sealed portion 2022 is formed to be 6.5 mm or more, and the folded portion is disposed only on either of both sides of the first reference plane P3 as in the prior art, a width of the folded portion may be entirely formed to be 3 mm or more, not to be included in the thickness range T of the accommodation portion 204.

This problem may be further exacerbated when the thickness T of the battery cell 10 is 6 mm. Therefore, the battery cell 10 of this embodiment may be configured such that the connection portion 2022b is connected to the accommodation portion 204 at the center of the folded portion 2022a.

Next, a method for manufacturing a battery cell according to this embodiment will be described.

FIGS. 3 to 8 are views illustrating a method of manufacturing the battery cell of FIG. 2, and illustrate a method of manufacturing a battery cell 10 having a thickness of 8 mm.

First, referring to FIG. 3, in a method of manufacturing a battery cell according to this embodiment, a sealed portion 202 may be formed by bonding edges in which a first case 11b and a second case 11a are in contact by a method such as thermal fusion or the like. In this process, the sealed portion 202 may be formed in a planar shape, and may be disposed on a first reference plane P3, as described above.

As described above, in this embodiment, a second sealed portion 2022 may be formed to have a width W1 of 6.5 mm or more in an unbent state thereof.

Subsequently, bending grooves G1, G2, and G4 may be formed to form first to third bent portions C1, C2, and C3.

Figure 4:
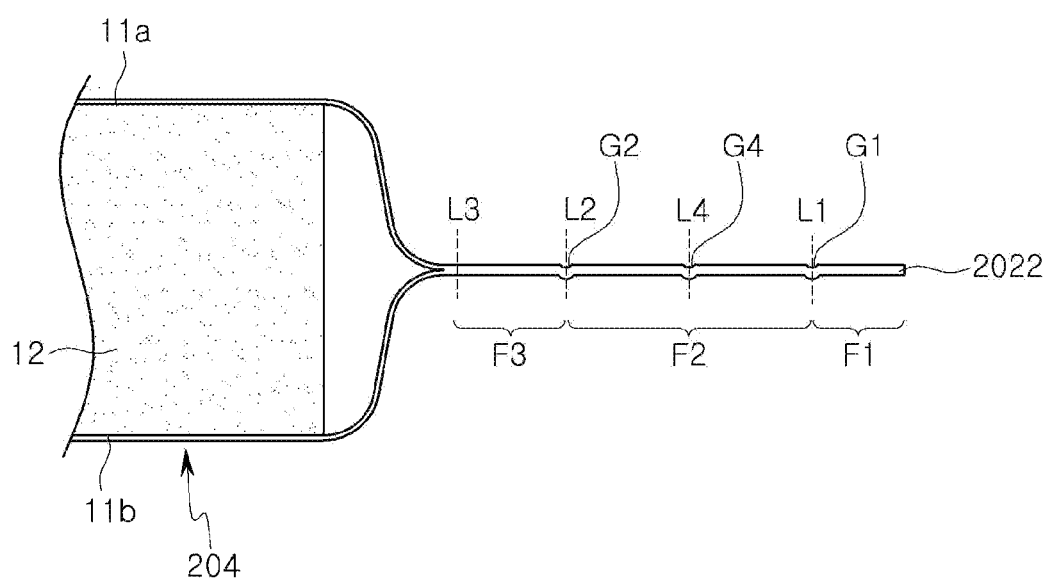

Based on the second sealed portion 2022, as illustrated in FIG. 4, a third bending line L3 may be disposed closest to an accommodation portion 204, and a first bending line L1 may be disposed farthest from the accommodation portion 204. Therefore, a second bending line L2 may be disposed between the third bending line L3 and the first bending line L1.

In a method of manufacturing a battery cell according to this embodiment, as illustrated in FIG. 4, the second sealed portion 2022 may be processed to form the bending grooves G1, G2, and G4 in positions in which the second sealed portion 2022 are bent. Pressing may be used for processing the bending grooves G1, G2, and G4, but is not limited thereto. The bending grooves G1, G2, and G4 may be provided to facilitate bending of the second sealed portion 2022. Therefore, as long as the second sealed portion 2022 is easily bent, the bending grooves G1, G2, and G4 are not limited in shape or structure.

In this embodiment, although formation of first and second bending grooves G1 and G2 corresponding to the first and second bending lines L1 and L2 are illustrated, a third bending groove may be also additionally formed in a position corresponding to the third bending line L3, as necessary.

As illustrated in FIG. 4, the second sealed portion 2022 may be to be divided into first, second, and third folded portions F1, F2, and F3 by the first and second bending grooves G1 and G2.

Figure 5:
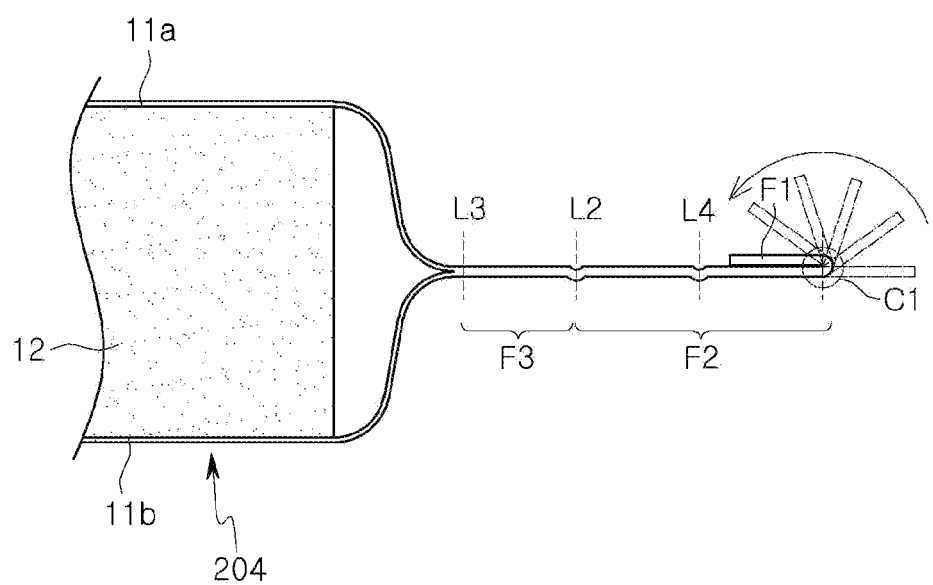

Subsequently, as illustrated in FIG. 5, first, the first folded portion F1 may be bent by 180°, based on the first bending line L1, to form the first bent portion C1. In this case, the first bent portion C1 may be formed by bending the second sealed portion 2022 along the first bending groove G1 such that portions of a first surface of the second sealed portion 2022 are in contact.

The first folded portion F1, overlapping the second folded portion F2 by the first bent portion C1, may be spaced apart from the second and third bending lines L2 and L3 by a predetermined distance. Therefore, the first folded portion F1 may not affect a process of forming the second and third bent portions C2 and C3, thereafter.

Figure 6:
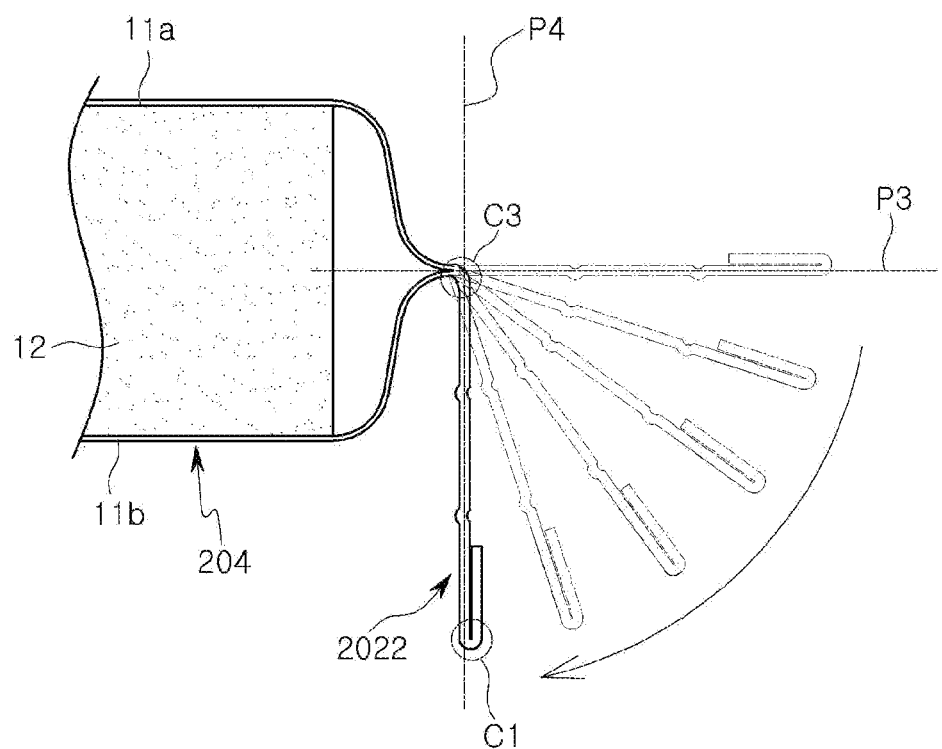

Next, as illustrated in FIG. 6, the second sealed portion 2022 may be bent by 90°, based on the third bending line L3, to form the third bent portion C3. The third bent portion C3 may be formed by bending the second sealed portion 2022 in a direction in which a second surface of the second sealed portion 2022 approaches the accommodation portion 204.

Therefore, the second sealed portion 2022 may be disposed on a second reference surface P4, orthogonal to the first reference surface P3. In this case, the second reference plane P4 may mean a plane disposed in a thickness direction of the battery cell 10.

Figure 7:
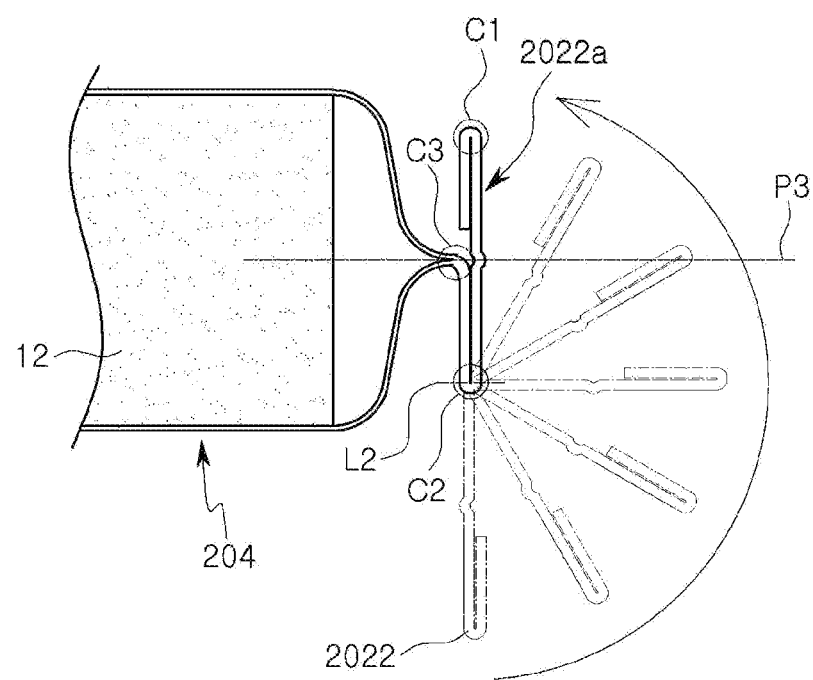

Then, as illustrated in FIG. 7, the second sealed portion 2022 may be bent by 180°, based on the second bending line L2, to form the second bent portion C2 and a folded portion 2022a. As the second bent portion C2 is formed, the folded portion 2022a may be disposed to oppose a side surface of the accommodation portion 204 in a form bisected by the first reference plane P3.

Figure 8:
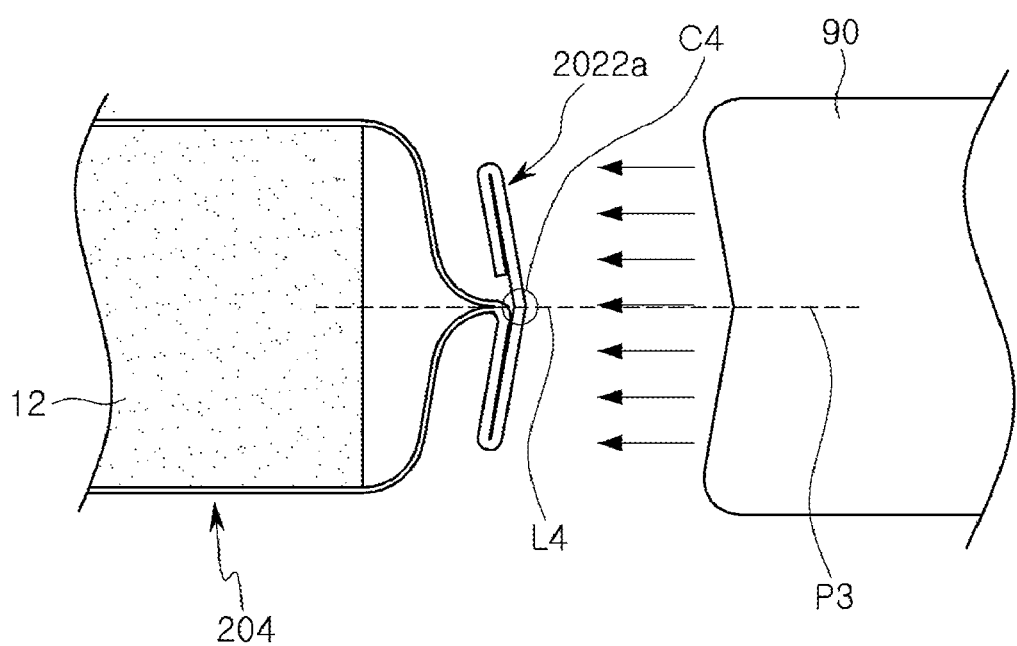
Figure 9:
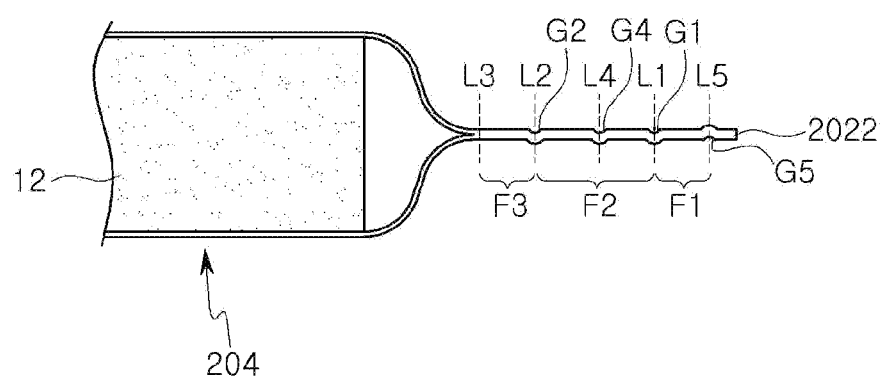
FIGS. 9 to 13 are views illustrating a method of manufacturing a battery cell according to another embodiment of the present disclosure.

A method of manufacturing a battery cell according to this embodiment may further include pressing the folded portion 2022a externally to bring the folded portion 2022a into close contact with the accommodation portion 204, as illustrated in FIG. 8.

When the bending the sealed portion is completed in the state illustrated in FIG. 7, phenomenon in which the folded portion does not maintain a right angle with the first reference plane and is widened with an obtuse angle may occur, due to a change with time in resin layer constituting the battery case.

To prevent this phenomenon, the manufacturing method of this embodiment may additionally perform an operation of adhering the folded portion 2022a to the accommodation portion 204.

In this operation, a high-temperature pressurizing device 90 may press the folded portion 2022a toward the accommodation portion 204 and may supply heat to the folded portion 2022a. Due to this, a width of the folded portion 2022a may be reduced, and a shape of the folded portion 2022a may be maintained in a state in close contact with the accommodation portion 204 as much as possible.

In this operation, the folded portion 2022a may be further bent along a fourth bending line L4. In this operation, the fourth bending line L4 may be disposed along the first reference plane P3. Therefore, the folded portion 2022a may include a fourth bent portion C4 bent along the fourth bending line L4 such that both side portions thereof are disposed close to the accommodation portion 204.

To this end, as illustrated in FIG. 4, in forming the bending grooves G1, G2, and G4, a fourth bending groove G4 may be formed together.

Even though a battery cell 10 having a thin thickness is manufactured in a battery cell and a method of manufacturing the same according to this embodiment, configured as described above, since a sealed portion 202 may be disposed within a thickness range T of the battery cell 10, interference between the battery cells 10 may be prevented when a battery module is manufactured.

FIGS. 9 to 13 are views illustrating a method of manufacturing a battery cell according to another embodiment of the present disclosure, and illustrate a method of manufacturing a battery cell having a thickness of 6 mm.

This embodiment may be configured similarly to the above-described embodiment, but has a difference in view that it further includes a fifth bending groove G5. Therefore, a detailed description of a configuration similar to the above-described embodiment will be omitted.

The fifth bending groove G5 may be formed in a position farthest from an accommodation portion 204. In addition, a separation distance between a first bending groove G1 and the fifth bending groove G5 may be formed to be the same as a separation distance between the first bending groove G1 and a fourth bending groove G4.

Figure 10:
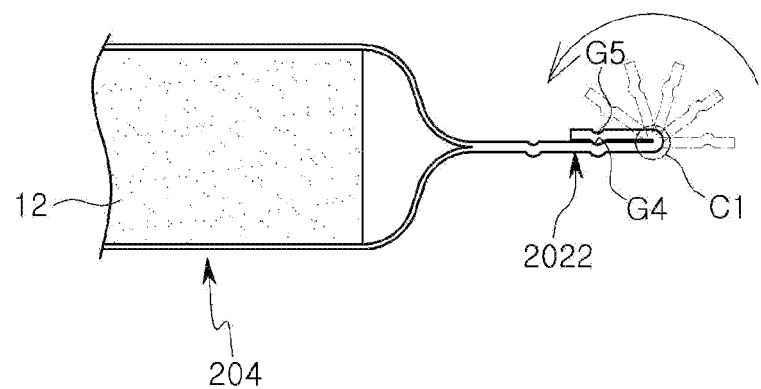
Figure 11:
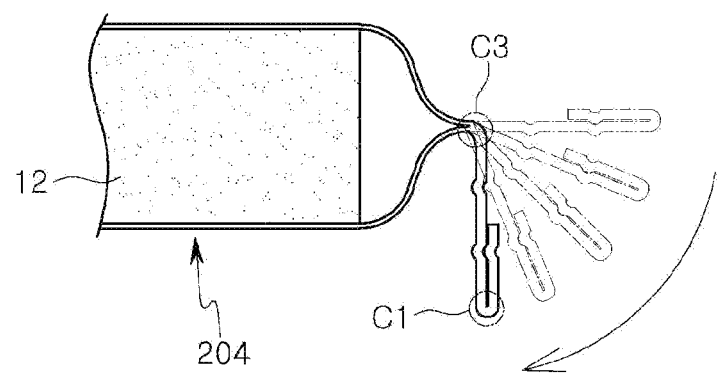

Therefore, when a second sealed portion 2022 is bent in a process of forming a first bent portion C1, as illustrated in FIG. 10, the fifth bending groove G5 may be disposed to overlap the fourth bending groove G4. Therefore, in the process of FIG. 13 of bending a folded portion 2022a along a fourth bending line L4 by a high-temperature pressurizing device 90, a first folded portion F1 may be bent, together with a second folded portion F2.

To this end, the fifth bending groove G5 may be formed to be concave in a direction, opposite to the fourth bending groove G4.

Figure 12:
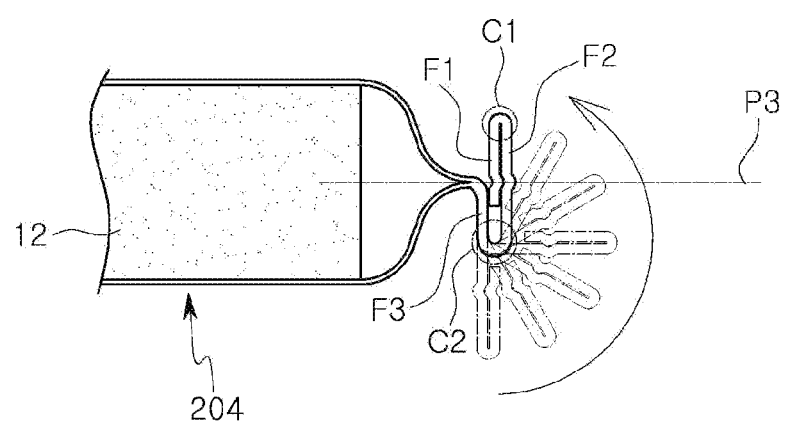
Figure 13:
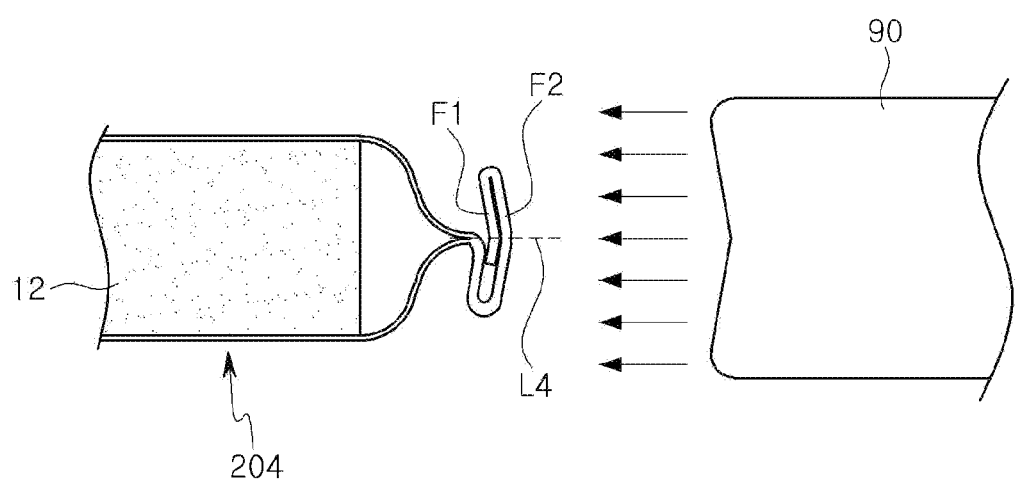
Figure 14:
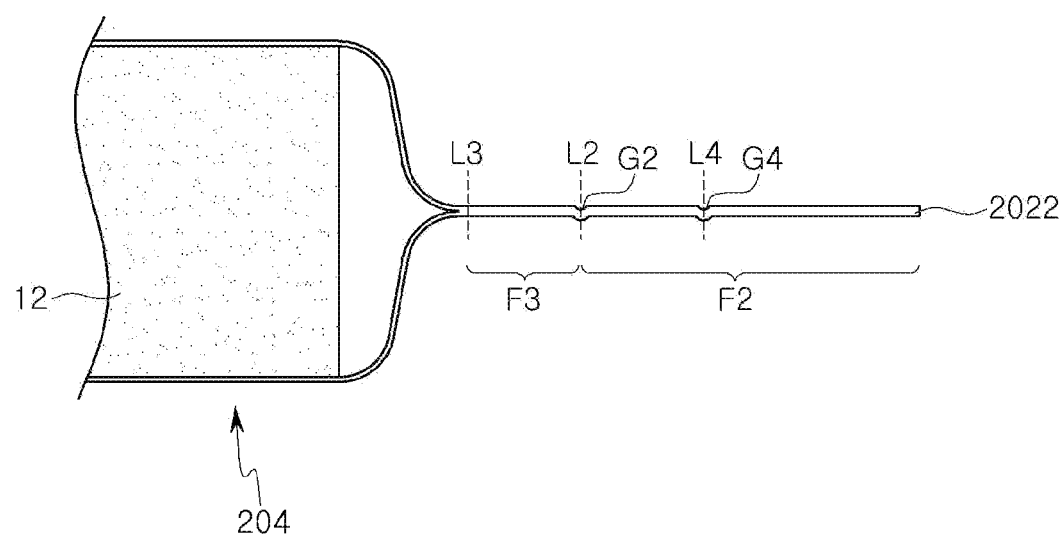
FIGS. 14 to 17 are views illustrating a method of manufacturing a battery cell according to another embodiment of the present disclosure.
Figure 15:
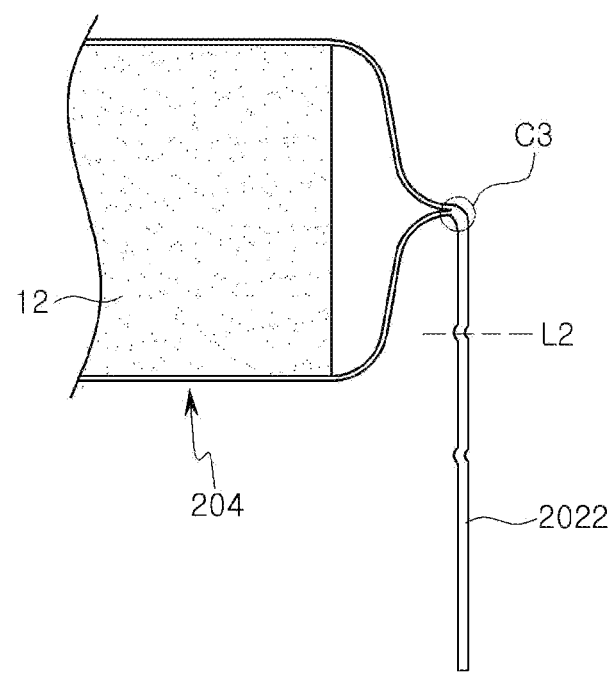

Also, as illustrated in FIG. 12, when a second bent portion C2 is formed, at least a portion of the first folded portion F1 may be disposed to contact the third folded portion F3. Therefore, in this embodiment, the folded portion 2022a may be formed in a state in which three layers overlap along a first reference plane P3. A configuration of the present disclosure is not limited thereto.

FIGS. 14 to 17 are views illustrating a method of manufacturing a battery cell according to another embodiment of the present disclosure.

This embodiment may be configured similarly to the embodiment of FIG. 2 described above, but has a difference in view that a first bent portion C1 is not included. Therefore, a detailed description of a configuration similar to the above-described embodiment will be omitted.

Figure 16:
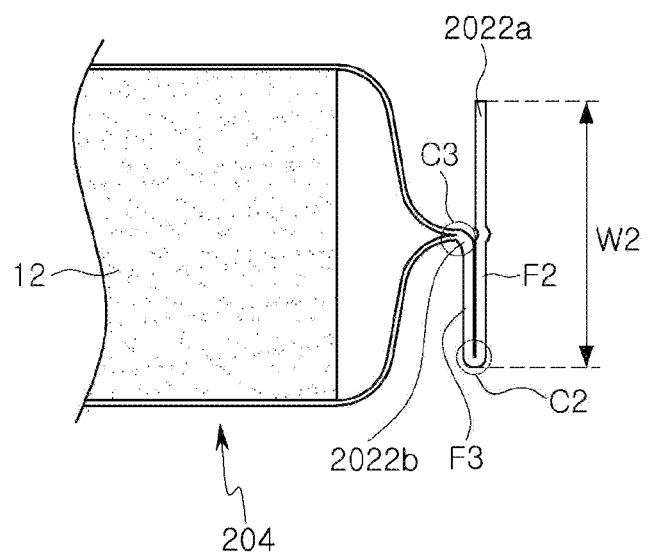
Figure 17:
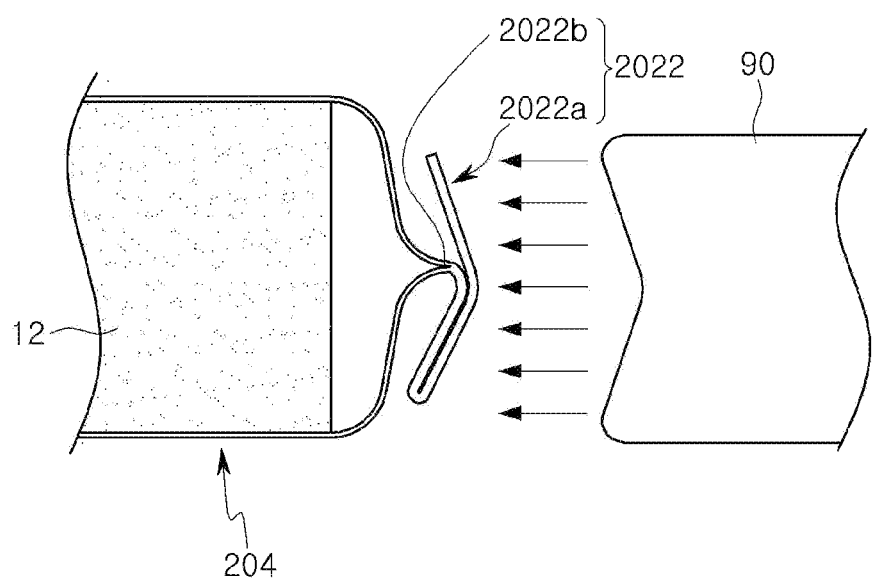

A folded portion 2022a of this embodiment may include only a second bent portion C2. Therefore, as illustrated in FIG. 16, the folded portion 2022a of this embodiment may consist of only a second folded portion F2 and a third folded portion F3, and a width W2 of the folded portion 2022a may be defined as a width of the second folded portion F2.

Similar to the above-described embodiments, a connection portion 2022b may be disposed at a center of the folded portion 2022a, to be connected to an accommodation portion 204.

According to an embodiment of the present disclosure, even when a battery cell having a thin thickness is manufactured, since a sealed portion is disposed within a thickness range of a battery cell, interference between battery cells may be prevented when a battery module is manufactured.

While example embodiments have been illustrated and described above, it will be apparent to those skilled in the art that modifications and variations could be made without departing from the scope of the present disclosure as defined by the appended claims.

What is claimed is:

1. A battery cell comprising:
an accommodation portion accommodating an electrode assembly; and
a sealed portion extending from a side surface of the accommodation portion externally, and being folded a plurality of times and included within a thickness range of the accommodation portion,
wherein the sealed portion comprises:
a folded portion disposed to oppose the side surface of the accommodation portion and having a width narrower than the thickness range of the accommodation portion; and
a connection portion connecting a center of the folded portion and the accommodation portion,
wherein the folded portion comprises at least one bent portion formed by folding the sealed portion by 180°,
wherein the folded portion comprises:
a first bent portion formed by folding the sealed portion by 180°;
a second bent portion spaced apart from the first bent portion and formed by folding the sealed portion by 180°, and
wherein a distance between the first bent portion and the second bent portion defines the width of the folded portion,
wherein the folded portion comprises a first folded portion, a second folded portion, and a third folded portion,
wherein the first folded portion and the second folded portion are divided by the first bent portion, and the third folded portion is distinguished from the second folded portion by the second bent portion,
wherein at least a portion of the first folded portion is positioned between the second folded portion and the third folded portion,
wherein at least the portion of the first folded portion is in contact with both the second folded portion and the third folded portion,
wherein the folded portion comprises a fourth bent portion formed in a position opposing the connection portion,
wherein the fourth bent portion is formed by folding the folded portion such that the folded portion is bent towards the accommodation portion, and
wherein a bending groove is formed on the sealed portion in the position in which the fourth bent portion is formed.

2. The battery cell of claim 1, wherein the width of the folded portion is formed to be smaller than the thickness range of the accommodation portion by 2 mm or more.

3. The battery cell of claim 1, wherein the thickness range of the accommodation portion is formed in a range of 6 mm to 8 mm.

4. The battery cell of claim 1, wherein a width of the sealed portion is formed to be larger than the thickness range of the accommodation portion, in a planar state that is unbent, and
   wherein the folded portion is disposed to be spaced apart from each of two planes defining the thickness range of the accommodation portion by at least a thickness of the folded portion.

5. The battery cell of claim 1, wherein the second and third folded portions are spaced apart.

6. The battery cell of claim 1, wherein the folded portion further comprises a third bent portion dividing the third folded portion and the accommodation portion, wherein the third bent portion includes no groove.

\* \* \* \* \*